Oct. 23, 1923.                                              1,471,476
            A. M. DEMUTH
    RECEPTACLE FOR REMOVING LIQUIDS FROM VESSELS
               Filed Aug. 14, 1922
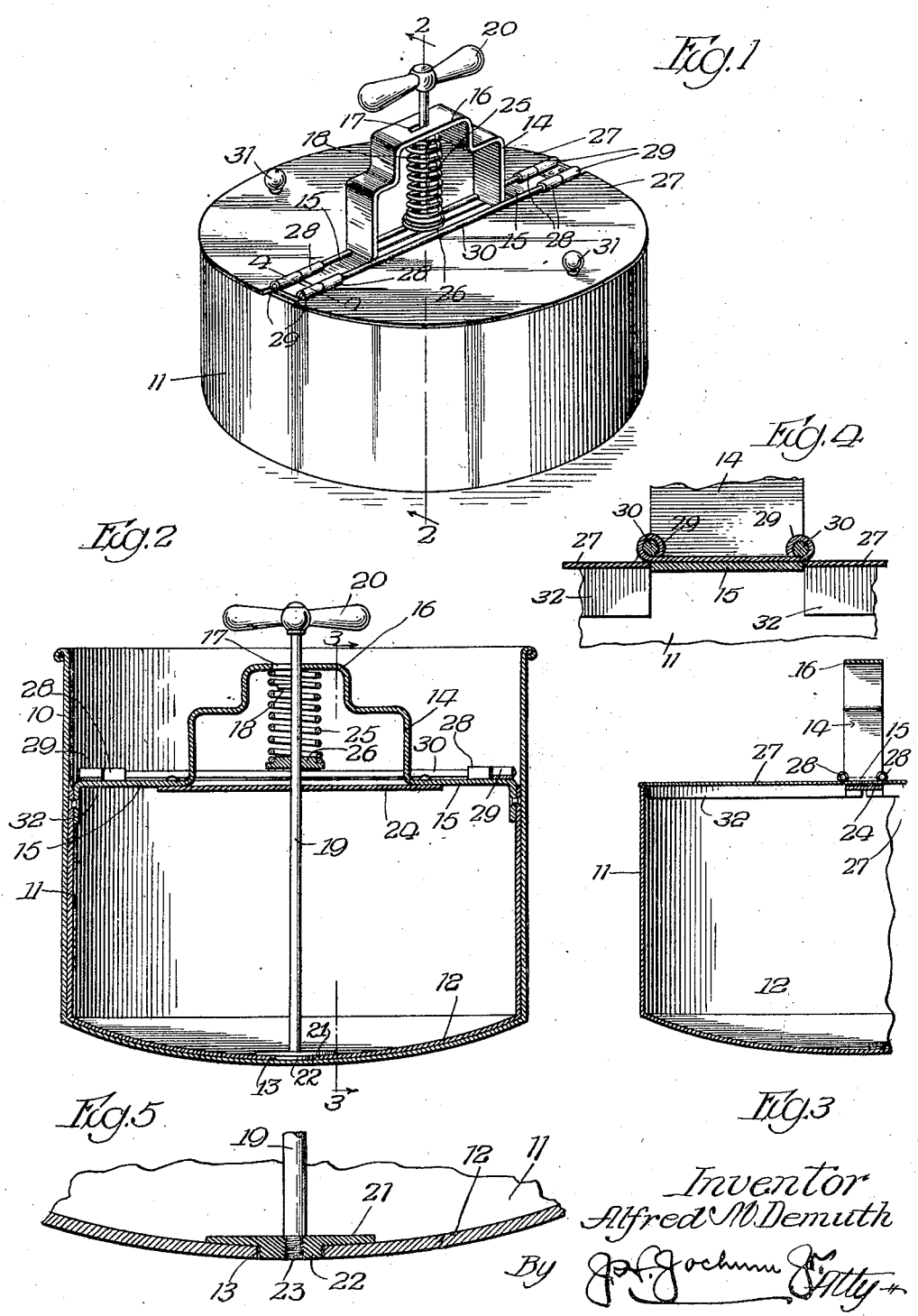
Inventor
Alfred M. Demuth
By J. P. Jochum Atty.

Patented Oct. 23, 1923.

1,471,476

UNITED STATES PATENT OFFICE.

ALFRED M. DEMUTH, OF CHICAGO, ILLINOIS.

RECEPTACLE FOR REMOVING LIQUIDS FROM VESSELS.

Application filed August 14, 1922. Serial No. 581,695.

*To all whom it may concern:*

Be it known that I, ALFRED M. DEMUTH, a citizen of the United States, residing at Chicago, in the county of Cook and State of Illinois, have invented certain new and useful Improvements in Receptacles for Removing Liquids from Vessels, of which the following is a specification.

With cooking apparatus it is sometimes advantageous to remove the liquid contents thereof without necessitating the lifting and dumping of the vessel.

Heretofore, except in vessels having a draw off, the liquids have been dipped or bailed out, but this is a slow operation and at the same time when the liquids are very hot or steaming, the operator is in danger of burning or scalding his hands.

To overcome these difficulties and objections and to provide improved means whereby the liquid may be readily and quickly removed from the vessel in one operation, by the insertion into the vessel of a receptacle provided with a valved opening for the admission of the liquid thereinto, and which opening is controllable at will, such a construction of receptacle, however, is shown in and constitutes broadly the subject matter of my co-pending application Serial No. 574,828.

It is one of the objects of the present invention, to provide an improved receptacle of this character provided with closure means whereby the steam from the liquids which have been delivered thereinto will not burn or scald the hands of the operator, and which closure means also serves the purpose of protecting the liquid contents of the receptacle.

A further object is to provide an improved receptacle of this character having an inlet opening in the bottom thereof, the opening and bottom of the receptacle being so constructed and arranged that the bottom of the receptacle will assume a position in close proximity to the bottom of the vessel, and the valve opening is so constructed that a valve seat may be omitted which will permit a portion of the valve to rest against the bottom of the receptacle thereby insuring a complete removal of the liquid from the vessel.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which, Figure 1 is a perspective view of the receptacle.

Figure 2 is a vertical sectional view of the receptacle as taken on line 2—2, Figure 1 and showing the receptacle in position within a vessel, the vessel being in vertical section.

Figure 3 is a detail, vertical, sectional view as taken on line 3—3, Figure 2.

Figure 4 is an enlarged detail sectional view as taken on line 4—4, Figure 1.

Figure 5 is an enlarged detail sectional view showing the valved opening in the bottom of the receptacle and the valve for closing the same.

Referring more particularly to the drawing the numeral 10 designates a vessel from which the liquid contents are to be removed and may be of any desired size and configuration.

The numeral 11 designates generally a comparatively shallow pan-like receptacle adapted to be inserted into the vessel 10, and is of a size and configuration to conform to the interior contour thereof.

In the bottom 12 of the receptacle 11 is arranged an inlet opening 13, through which opening the liquid in the vessel 10 is adapted to flow into the receptacle when the receptacle is placed thereinto, and this opening also serves as a means for discharging the liquid from the receptacle 11 when desired.

Connected with the receptacle 11 is a bail-like handle 14, the extremities 15 of the handle being preferably substantially horizontal and extending beyond the handle portion to engage the wall of the receptacle, and to which walls the extremities are secured in any suitable manner. The handle 14 is provided with a substantially horizontal portion 16, and which portion is adapted to be grasped by the hand of the operator to transport the receptacle 11.

The portion 16 of the handle is provided with an opening 17 therethrough and through which opening 17 a pin or lug 18 connected with a stem 19 is adapted to pass. This stem 19 is provided on one end with a suitable handle 20 and on its other end with a valve provided with a flat body portion 21 and a reduced portion 22. The valve is secured to the stem 19 in any suitable manner such as by means of threads 23 on the end of the stem, and which threads enter a suitable threaded opening in the valve.

The portion 22 of the valve 21 is of a size and configuration to snugly fit within the opening 13 and is of a diameter considerably less than the diameter of the body portion 21 of the valve, so that when the portion 21 of the valve is seated within the opening 13 the portion 21 of the valve will rest flat against the bottom 12 of the receptacle 11, thereby obviating the necessity of providing a valve seat around the opening 13 in the bottom 12 of the receptacle.

The valve is adapted to be seated and unseated by shifting the stem 19 longitudinally, which is accomplished through the medium of the handle 20. When it is desired to maintain the valve in an unseated or open position the stem 19 is shifted longitudinally a sufficient distance to permit the pin or projection 18 thereon to pass through the opening 17 in the portion 16 of the handle 14, after which the stem 19 is rotated so that the pin or lug 18 will be moved out of alinement with the opening 17.

If desired a guide bar or member 24 may be provided for the stem 19.

Encompassing the stem 19 is an elastic member 25, preferably in the form of a coil spring, one end of which abuts the lower face of the portion 16 of the handle 14 and the other end engages a collar or shoulder 26 carried by the stem 19. The normal tendency of the spring 25 is to move the stem 19 in a direction to seat the valve and when it is desired to unseat the valve the stem 19 is moved against the stress of the spring 25.

With this improved construction it will be manifest that the outer surface of the bottom 12 of the receptacle 11 is smooth and conforms with the contour of the bottom of the vessel 10, so that when the receptacle is placed within the vessel the bottom 12 of the receptacle will rest flat against the bottom of the vessel. Furthermore, with this improved construction of valve it will be manifest that the necessity of a valve seat within the receptacle is also obviated, thereby insuring a complete removal of all of the liquid contents of the vessel 10.

The handle 20 on the stem 19 is disposed in such a position with respect to the portion 16 of the handle 14 as to permit the operator to grasp both handles with one hand when manipulating the receptacle 11.

In use, the valve is unseated and the receptacle is then placed within the vessel. The receptacle may be released and allowed to gravitate within the vessel or may be moved downwardly by the operator. During this operation the liquid within the vessel will flow into the receptacle 11 through the opening 13, and when all of the liquid has entered the receptacle 11 the stem 19 may be rotated by the handle 20 so that the pin 18 will pass through the opening 17, at which time the spring 25 will seat the valve and close the opening 13.

The receptacle may be then removed from the vessel and the contents allowed to remain in the receptacle or if desired, may be discharged therefrom by again unseating the valve so that the contents may flow through the opening 13.

As a means for protecting the hands of the operator from being scalded or burned and also as a means for protecting the contents of the receptacle 11, the receptacle is provided with a suitable closure which, in the present form of the invention, embodies two cover members 27, each of which is provided with knuckles 28 arranged in alinement with knuckles 29 secured to the portion 15 of the handle 14, and a pintle pin 30 passes through the registering knuckles to form a hinged joint.

If desired a knob or handle 31 may be provided on each of the cover sections 27 and as a means for preventing the escape of steam around the edge of the cover sections 27, each of the cover sections may be provided with a depending flange 32, and which flange also serves as a re-enforcing means for the cover sections.

With this improved construction it will be manifest that the contents of the receptacle 11 may be discharged therefrom either through the opening 13 or by raising one of the cover sections 27 and dumping the contents therefrom. When the cover section is raised to pour out the contents of the receptacle 11 the cover serves as a shield for protecting the hands against the steam arising from the contents of the receptacle.

While the preferred form of the invention has been herein shown and described it is to be understood that various changes may be made in the details of construction and in the combination and arrangement of the several parts, within the scope of the claims, without departing from the spirit of this invention.

What is claimed as new is:

1. As an article of manufacture, a receptacle for removing liquids from vessels by insertion thereof into the vessel and embodying a comparatively shallow open pan like body having an opening through the bottom thereof, a handle connected with the receptacle to project thereabove and disposed within the confines of the periphery of the receptacle, a valve for controlling said opening, a stem and handle connected with the valve, and a closure hinged to the receptacle for free swinging movement toward the handle on a horizontal axis, the said handle projecting above the closure, the said closure serving as a shield for the hands of the operator in any position of the closure.

2. As an article of manufacture, a receptacle for removing liquids from vessels by the insertion thereof into the vessel and embodying a comparatively shallow open pan like body having an opening through the bottom thereof, a handle connected with the receptacle to project thereabove, a valve for controlling said opening, a stem connected with the valve, means tending normally to close the valve, a handle on the stem for opening the valve, and a closure for the receptacle hinged at a point adjacent the said handle for free swinging movement on a horizontal axis, said closure serving to shield the hands of the operator in any position of the closure.

3. As an article of manufacture, a receptacle for removing liquids from vessels by insertion thereof into the vessel, and embodying a comparatively shallow open pan like body having an opening through the bottom thereof, a handle connected with the receptacle, a valve for controlling said opening, a stem and handle connected with the valve, and a closure for the receptacle, said valve having a body adapted to rest flat against the bottom of the receptacle around said opening and being provided with a reduced portion adapted to enter and fill said opening.

In testimony whereof I have signed my name to this specification, on this 10th day of August, A. D. 1922.

ALFRED M. DEMUTH.